(12) United States Patent
Sterte et al.

(10) Patent No.: US 6,949,239 B2
(45) Date of Patent: *Sep. 27, 2005

(54) PROCESS FOR PRODUCTION OF MACROSTRUCTURES OF A MICROPOROUS MATERIAL

(75) Inventors: Per Johan Sterte, Lulea (SE); Lubomira Borislavova Tosheva, Lulea (SE); Valentin Panov Valtchev, Sofia (BG)

(73) Assignee: ExxonMobil Chemical Patents Inc., Houston, TX (US)

(*) Notice: Subject to any disclaimer, the term of this patent is extended or adjusted under 35 U.S.C. 154(b) by 48 days.

This patent is subject to a terminal disclaimer.

(21) Appl. No.: 10/379,876

(22) Filed: Mar. 5, 2003

(65) Prior Publication Data

US 2003/0223933 A1 Dec. 4, 2003

Related U.S. Application Data

(62) Division of application No. 09/312,877, filed on May 17, 1999, now Pat. No. 6,569,400.

(30) Foreign Application Priority Data

Jun. 30, 1998 (SE) .............................................. 9802303

(51) Int. Cl.⁷ .......................... C01B 39/02; C01B 39/14; C01B 39/36
(52) U.S. Cl. ............... 423/716; 423/335; 423/DIG. 22; 423/DIG. 24; 423/DIG. 27; 501/81; 501/154; 502/60; 502/62; 502/159
(58) Field of Search .............................. 501/80–82.153, 501/154; 423/700, 716, 328.2, 335, 339, 625, 628, DIG. 22, DIG. 24, DIG. 27; 502/60, 62, 159

(56) References Cited

U.S. PATENT DOCUMENTS

| 4,116,858 A | 9/1978 | Lee et al. .................... 252/184 |
| 4,217,240 A | 8/1980 | Bergna ....................... 252/313 |

(Continued)

FOREIGN PATENT DOCUMENTS

| EP | 103035 | 3/1984 | ........... C01D/15/00 |
| EP | 201264 | 12/1986 | ........... C01B/33/28 |

(Continued)

OTHER PUBLICATIONS

Utracki et al. eds, Multiphase Polymers: Blends and Ionomers, Chapter 16, Mauritz et al., Perfluorinated–Ionomer Membrane–Based Microcomposites, Silicon Oxide Filled Membranes, pp. 401–417, 1989.*

*Primary Examiner*—David Sample

(57) ABSTRACT

The invention involves a process for production of macrostructures of a microporous material. The process is characterized by the fact that seeds formed in or introduced by ion exchange or adsorption to a porous organic ion exchanger with the desired size, shape and porosity are made to grow and form a continuous structure by further deposition of inorganic material from a synthesis solution under hydrothermal conditions. The organic ion exchanger can be eliminated by chemical destruction or dissolution and, in so doing, leaves behind an inorganic microporous structure with the size and shape of the employed organic ion exchanger.

29 Claims, 4 Drawing Sheets

U.S. PATENT DOCUMENTS

| | | |
|---|---|---|
| 4,337,171 A | 6/1982 | Kulprathipanja et al. ... 252/430 |
| 4,670,303 A | 6/1987 | Miles .................... 427/213.31 |
| 4,680,170 A | 7/1987 | Lowe et al. ................ 423/329 |
| 5,399,535 A | 3/1995 | Whitman ..................... 501/80 |
| 5,863,519 A | 1/1999 | Golman et al. ............ 424/9.36 |
| 5,916,837 A | 6/1999 | Harmer et al. ............. 502/170 |
| 6,241,960 B1 | 6/2001 | Topsoe ...................... 423/700 |

FOREIGN PATENT DOCUMENTS

| | | | | |
|---|---|---|---|---|
| EP | | 0217143 | 4/1987 | ........... B01J/39/02 |
| EP | | 0260826 | 3/1998 | ........... B01J/35/00 |
| EP | | 0878233 | 11/1998 | ........... B01J/29/00 |
| GB | | 2283168 | 5/1995 | ........... A47C/27/14 |
| SE | | 463657 | 1/1991 | ........... B21C/43/00 |
| WO | WO 82/03571 | | 10/1982 | |
| WO | WO 90/09235 | | 8/1990 | ........... B01J/20/18 |
| WO | WO 94/05597 | | 3/1994 | ........... C01B/33/26 |
| WO | WO 94/25151 | | 11/1994 | ........... B01J/20/18 |
| WO | WO 95/29751 | | 11/1995 | ........... B01D/71/02 |
| WO | WO 96/07713 | | 3/1996 | ........... C01F/67/00 |

\* cited by examiner

PROCESS FOR PRODUCTION OF MACROSTRUCTURES OF A MICROPOROUS MATERIAL

This application is a divisional of application Ser. No. 09/312,877, filed May 17, 1999, now U.S. Pat. No. 6,569,400, which claims priority to Swedish Patent Application No. 9802303-9, filed Jun. 30, 1998.

This application claims priority to Swedish Patent Application No. 9802303-9, filed Jun. 30, 1998.

FIELD OF THE INVENTION

The present invention concerns a process for production of macrostructures with controlled size and shape of a microporous inorganic material.

BACKGROUND OF THE INVENTION

Microporous material is characterized by a large specific surface area in pores with a pore radius below 20 Å and is used in a large number of applications of considerable commercial importance. In most of these applications, the fact that the phase interface between the solid porous material and the medium (liquid or gas) in which it is used is large is of decisive importance. Heterogeneous phase catalysts for refinery processes for petrochemical conversion processes and for different environmentally related applications are often based on microporous material. Adsorbents for selective adsorption in the gas or liquid phase are microporous materials, like most of the inorganic ion exchangers used for selective separation of ionic compounds. In addition to these large, scale and relatively established applications, microporous materials have recently become increasingly interesting in a number of more technologically advanced areas. Examples include use in chemical sensors, in fuel cells and batteries, in membranes for separation or catalytic purposes, during chromatography for preparative or analytical purposes, in electronics and optics and in the production of different types of composites.

Although a large phase interface is often a fundamental requirement for use of porous materials in different applications, a number of additional requirements related to the specific area of application are imposed on these materials. The large phase interface available in the micropores must be accessible and useable. Porosity, pore size and pore size distribution in large pores (meso- and macropores) are therefore often of major significance, especially when mass transport can be a rate limiting factor. The chemical properties on the surface of the porous material can also be of decisive importance for the performance of the material in a given application. In this context, the purity of the material is, consequently, also significant. In most practical applications, the size and shape of the porous macrostructures and the degree of variation of these properties are of decisive importance. During use, the size and shape can influence properties like mass transport within the porous structures, pressure drop over a bed of particles of the material and the mechanical and thermal strength of the material. Which factor or factors are most important will vary strongly between different applications and are also highly dependent on the layout of the process in which the application occurs. Techniques that permit production of a material with increased specific surface area, pore structure (pore size/pore size distribution), chemical composition, mechanical and thermal strength, as well as increased and uniform size and shape, are consequently required to tailor porous inorganic macrostructures to different applications.

Microporous materials can be divided into crystalline molecular sieves and amorphous materials. Molecular sieves are characterized by the fact that they have a pore system through their regular crystal structure, in which the pores have a very well defined size in the range 2–20 Å with an exact value determined by the structure. The size of most molecules that are gases and liquids at room temperature, both inorganic and organic, is found within this size range. By selecting a molecular sieve with the appropriate pore size, use of molecular sieves for separation of one substance (one type of molecule) in a mixture is made possible by selective adsorption, hence the name molecular sieve. In addition to selective adsorption of uncharged substances, the well-defined micropore system of the molecular sieve offers a possibility for selective ion exchange of charged species and size selective catalysis. In this case, properties other than the micropore structure in molecular sieves are also of major significance, like ion exchange capacity or specific surface area and acidity. Molecular sieves can be divided into a number of subgroups, depending on chemical composition and structure. A commercially important subgroup are the zeolites, which, by definition, are crystalline microporous aluminosilicates. Another interesting subgroup is the microporous metal silicates, which are structural analogs of the zeolites, but do not contain any (or very little) aluminum.

A summary of the prior art, in terms of production, modification and characterization of molecular sieves, is described in the book Molecular Sieves—Principles of Synthesis and Identification (R. Szostak, Blackie Academic & Professional, London, 1998, Second Edition). In addition to molecular sieves, amorphous microporous materials, chiefly silica, aluminum silicate and aluminum oxide, have been used as adsorbents and catalyst supports. A number of long-known techniques, like spray drying, prilling, pelletizing and extrusion, have been and are being used to produce macrostrucfures in the form of, for example, spherical particles, extrudates, pellets and tablets of both micropores and other types of porous materials for use in catalysis, adsorption and ion exchange. A summary of these techniques is described in Catalyst Manufacture, A. B. Stiles and T. A. Koch, Marcel Dekker, New York, 1995.

Because of limited possibilities with the known technique, considerable investment has been made to find new ways to produce macrostructures of microporous materials, with a certain emphasis on those in the form of films.

EP 94/01301 describes production of films of molecular sieves by a process in which seed crystals of molecular sieves are deposited on a substrate surface and then made to grow together into a continuous film. GB 94/00878 describes production of films of molecular sieves by introduction of a substrate to a synthesis solution adjusted for zeolite crystallization and crystallization with a gradual increase in synthesis temperature. SE 93/00715 describes production of colloidal suspensions of identical microparticles of molecular sieves with an average size below 200 nm. SE 90/00088 describes a method for production of an adsorbent material in the form of a monolith by impregnation of the monolithic cell structure with a hydrophobic molecular sieve, followed by partial sintering of the molecular sieve with the material from which the cell structure is constructed.

Although a number of different techniques already exist for production of microporous inorganic macrostructures with the desired size and shape, these techniques are beset with a number of limitations that affect the properties of the macrostructures during use in the intended application. Most of these techniques require the use of a binder to give the structure acceptable mechanical strength. This binder often adversely affects other desired properties, like high specific surface area and uniform chemical composition. For most of the existing techniques, other possibilities for keeping variations in size and shape within narrow limits are sharply constrained. If a well defined size is desired with a narrow particle size distribution, one is most often obliged to carry out processing by separation, which leads to considerable waste during manufacture. The use of different types of binders also affects the pore structure in the resulting macrostructure and it is often necessary to find a compromise, in which the desired pore structure is weighed against the mechanical properties of the material. It is often desirable to have a bimodal pore size distribution in the macrostructures of macroporous materials, in which the micropores maintain a large specific phase interface, whereas the larger pores in the meso- or macropore range permit transport of molecules to the surface and, in this way, prevent limitations caused by slow diffusion. During production of microporous macrostructures according to the known technique, a secondary system of pores within the meso- and/or macropore range can be produced by admixing a particulate inorganic material or by admixing organic material (for example, cellulose fibers), which are later eliminated by calcining. Both of these techniques, however, produce an adverse effect on the other properties of the resulting material.

SUMMARY OF THE INVENTION

With the present invention, it has been possible to reduce or eliminate the drawbacks of the known methods and devise a process for production of macrostructures of microporous materials with controlled size, shape and porosity.

One objective of the present invention is to reduce or eliminate the drawbacks in the known methods for production of microporous macrostructures with a new process that permits production of these structures without addition of binders and with a uniform final composition. Another objective of the present invention is to provide a process, according to which the final shape, size and size distribution of the structure can be controlled with high precision by selecting the starting material. Still another objective of the present invention is to provide a process according to which both the micropore structure of the material and a secondary system of larger pores can be controlled by selecting the starting material and synthesis conditions. A further objective of the present invention is to provide a process for production of macrostructures of microporous material with good mechanical and thermal stability.

DETAILED DESCRIPTION OF THE INVENTION

Figure 1:
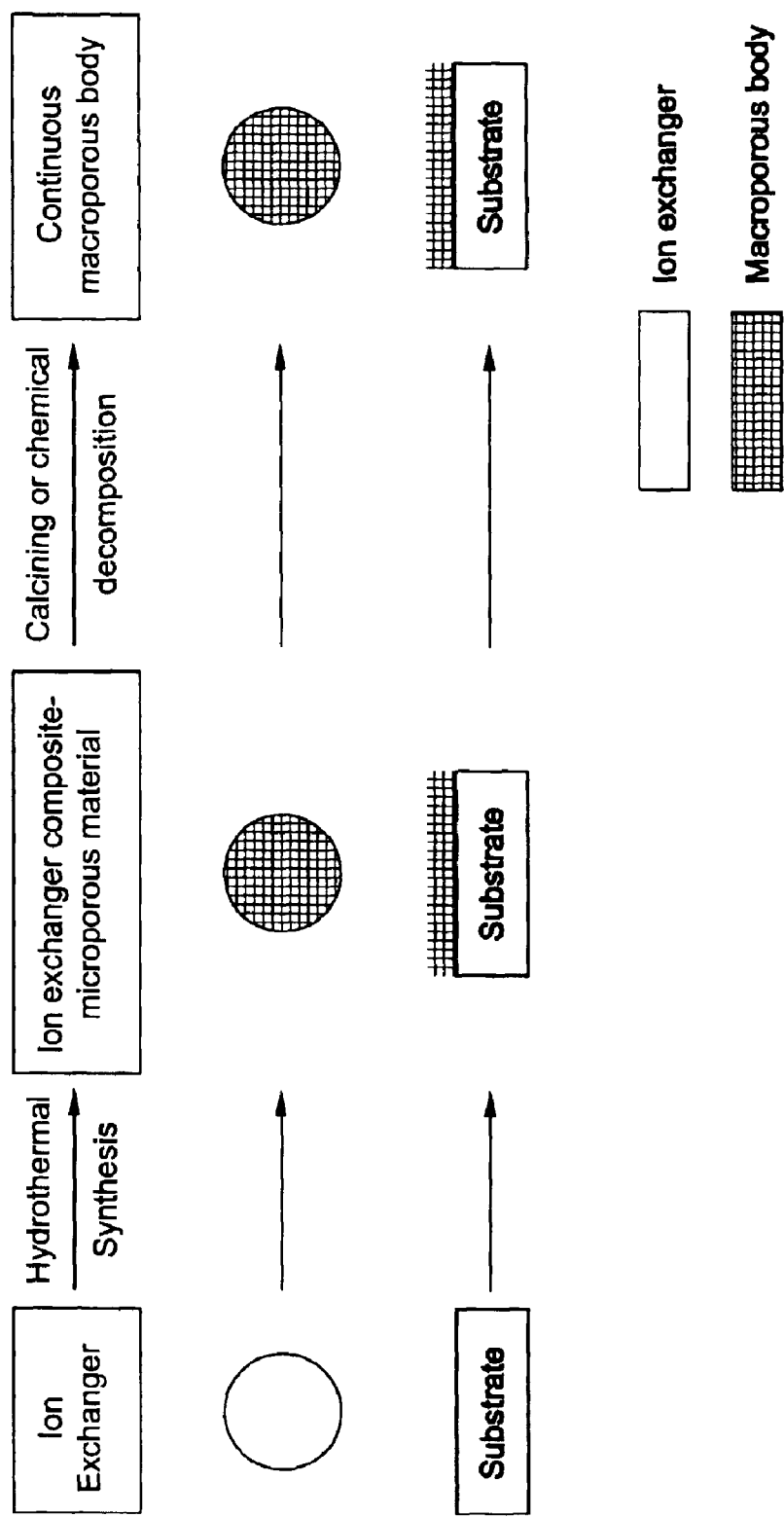
FIG. 1 represents a schematic description of the different stages in production of spherical particles or thin films of microporous material according to the invention.

The present invention concerns a process for the production of macrostructures of microporous material, characterized by the fact that seeds formed in or introduced by ion exchange or adsorption to a porous organic ion exchanger with the desired size, shape and porosity, are made to grow and form a continuous structure by further deposition of inorganic material from a synthesis solution under hydrothermal conditions, and that the organic ion exchanger is then eliminated such as by chemical destruction or dissolution and, in so doing, leaves behind an inorganic microporous structure with the size and shape of the employed organic ion exchanger. A schematic description of the method according to the invention is shown in FIG. 1.

Microporous material refers to a material in which most of the specific surface area is found in pores with a diameter below 20 Å. A crystalline microporous material, usually called molecular sieves or zeolites, is of special interest for the invention. Materials like silicalite-1, ZSM-5, zeolites A, Y, mordenite, Beta, L, ZSM-2, X and hydroxysodalite are of special interest. Different types of amorphous silicates are also of interest.

Macrostructures refer to structures with a size that exceeds 0.01 mm in one dimension, preferably 0.1 mm and, in most cases, 1.0 mm. Examples of macrostructures are spherical particles, cylindrical extrudates, pellets, fibers, thin films applied to different forms of substrates and other composites, in which the microporous material is combined with other types of material.

Organic ionic exchanger refers to a polymer-based porous material with a fixed surface charge and with high ion exchange capacity for anions or cations. A large number of different types of organic ion exchangers are commercially available including organic ion exchanges sold under the tradenames Dowex and Amberlite. This covers a broad spectrum of different cation and anion exchangers with varying ion exchange capacity, porosity, pore size and particle size. Ion exchangers with an apparent anion exchange capacity, typically greater than about 1 meg/gm of dry anion exchanger, are of special interest to the present invention. Ion exchangers of the strongly basic type, containing quaternary ammonium groups, have been found to be particularly suited for use in the present invention. Commercially available ion exchangers are generally in the form of spherical particles with a relatively narrow particle size distribution. Organic ion exchangers with a size and shape other than spherical, for example, fibers or flakes, however, can be produced according to known techniques. It is also known that films of organic ion exchangers can be deposited on different forms of substrates.

The term "seeds" refers to silicate species, metal silicate species or aluminosilicate species present in the synthesis mixtures or formed in an early stage of synthesis, characterized by the fact that by treatment in a solution with appropriate concentration and under suitable conditions, they can be made to grow and form a continuous structure in the pore system of the ion exchanger. The term "seeds" also includes microcrystals, i.e., crystals of molecular sieves with a size below 200 nm, and whose crystal structure can be identified by X-ray diffraction. Production of microcrystals of molecular sieves suitable as seeds for production of microporous macrostructures according to the invention is described in WO 94/05597 which is hereby incorporated by reference.

In a second phase in production of microporous macrostructures according to the invention, the seeds formed on or bonded to the surface in the organic ion exchanger are made to grow by hydrothermal treatment in an appropriate synthesis solution. Through this growth a continuous three-dimensional network of microporous material is formed in the pore structure of the employed ion exchange structure. After this stage, the product is therefore a composite material, consisting of two continuous three-dimensional networks, one organic, consisting of the polymer structure of the ion exchanger, and one inorganic, consisting of the introduced inorganic microporous material. Introduction of seeds can be carried out physically in a separate stage, with a subsequent growth stage under hydrothermal conditions in a synthesis solution. However, it is also possible and often advantageous not to separate these stages but instead to directly introduce the ion exchanger material into a synthesis solution and expose this to hydrothermal conditions, during which seeds are formed in or ion-exchanged from the synthesis solution to the ion exchanger, to then grow into a continuous structure.

Molecular sieves of the zeolite or crystalline microporous metal silicate type are generally produced by hydrothermal treatment of a silicate solution with well-defined composition. This composition and the synthesis parameters, like temperature, time and pressure, dictate which type of product is obtained and the size and shape in the crystals that are formed. This applies both in syntheses, in which the final product is deposited as crystals in the porous structure of an ion exchanger, and in conventional synthesis, when the final crystal size is most often much larger. The type of material deposited in the pore system of the ion exchanger is therefore dependent on the composition of the synthesis mixture and the conditions during synthesis. During crystallization of macrostructures of a given molecular sieve according to the present invention, it has been found suitable to use synthesis mixtures, which, in the absence of ion exchanger material, result in colloidal suspensions of the molecular sieve in question. In some cases, the ion exchanger material has also been found to influence the result of synthesis. For example, when certain ion exchanger materials are used, an amorphous macrostructure of microporous silica with very large specific surface area can be produced by means of a synthesis solution and under conditions which, in the absence of an ion exchanger, produce a crystalline molecular sieve. A parameter of great interest in this connection has been found to be the ratio between amount of ion exchanger and amount of synthesis solution. Under otherwise identical conditions and during the use of the same synthesis solution, a low ratio between the amount of ion exchanger and amount of synthesis solution yields a well crystallized product, whereas an intermediate ratio yields a mixture of crystalline and amorphous microcrystalline material, and a high ratio leads to an entirely amorphous microporous material. Hydrothermal treatment refers to treatment in aqueous solution or aqueous suspension at a temperature exceeding 50° C., preferably exceeding 80° C. and, in most cases, exceeding 95° C.

The composite of ion exchanger and microporous inorganic material obtained after this process can be of interest by itself in certain commercial applications. However, for most potential areas of application it is advantageous to eliminate the organic ion exchanger structure. This can occur in a last stage of the process according to the invention, which leaves behind only a microporous material with a secondary pore system with a porosity and pore size caused by the structure of the employed organic ion exchanger. Elimination of the organic material that makes up the ion exchanger preferably occurs by calcining at a temperature exceeding 400° C. in the presence of acid, in which this material is burned to mostly carbon dioxide and water. As an alternative, the organic material can be eliminated by selective dissolution with a solvent that dissolves the ion exchanger, but not the inorganic material, or with selective decomposition of the inorganic material by means of a chemical reaction other than a combustion reaction.

The resulting material according to the invention is a replica in size and shape of the organic ion exchanger used as starting material. This means that the possibilities for controlling the size, shape and meso/macroporosity in the inorganic microporous material are largely determined by the possibilities of structural manipulation of the properties of the ion exchanger. The secondary pore structure that develops during removal of the organic ion exchanger material, however, can be further manipulated by continued deposition after removal of this material. By growth of the inorganic structure after this stage, the secondary pore structure can be more or less sealed and, in the extreme case, leave behind a homogeneous microporous material (without porosity in the meso/macropore range). This could be of interest, for example, in the production of thin films of microporous structures, for use in applications, like membranes for catalyst or separation purposes, or in chemical sensors. It is also possible, according to a known technique, to coat the surface of the macrostructures of a given type of microporous material produced according to the invention with a thin film of another type of material, something that could be of interest in a catalytic context or during use of macrostructures for controlled dosage of drugs or pesticides.

The process according to the present invention was evaluated by means of investigation of materials produced according to the process with a scanning electron microscope (SEM), X-ray diffractometry (XRD), spectroscopy and by measurements of the specific surface area and pore size distribution with krypton or nitrogen adsorption.

Scanning electron microscope studies were conducted on samples coated with gold (by a sputtering technique). A scanning electron microscope of the Philips XL 30 type with a Lanthanum hexa-Boride emission source was used in these studies.

X-ray diffraction studies were conducted with a Siemens D-5000 powder diffractometer.

Nitrogen adsorption measurements to determine specific surface area and particle size distribution were carried out with an ASAP 2010 from Micrometrics Instruments, Inc.

Elemental analysis concerning carbon, nitrogen and hydrogen was carried out on certain samples by means of an analytical instrument from LECO Corporation (LECO CHN-600). The particle size and particle size distribution for the colloidal suspensions of discrete microcrystals of molecular sieves used as starting material according to the process were investigated by dynamic light scattering (ZetaPlus, Brookhaven Instruments).

The following examples illustrate the invention are not but intended to limit the invention.

EXAMPLE 1

This example describes production of spherical particles of microporous amorphous silica with very high specific surface area.

A synthesis solution with the composition (on a molar basis): 9 TPAOH/25 $SiO_2$/480 $H_2O$/100 EtOH (TPAOH= tetrapropylammonium hydroxide, EtOH=ethanol) was produced by mixing 20.0 grams tetraethoxysilane (>98%, Merck), 34.56 grams tetrapropylammonium hydroxide (1.0M solution, Sigma) and 5.65 grams distilled water. The mixture was allowed to hydrolyze in a polyethylene flask on a shaking table for 12 hours at room temperature. 1.0 grams of a strongly basic anion exchanger of the Dowex 1X2-100 type was added to 10 grams of this synthesis solution. The anion exchanger was present as spherical particles in the particle size range 50–100 mesh (dry) and had an ion exchange capacity specified by the manufacturer of 3.5 mEq/g. The mixture of ion exchanger and synthesis solution was treated in a polyethylene reactor equipped with a reflux condenser in an oil bath at 100° C. for 48 hours. After this time, the ion exchanger particles were separated from the solution by filtration and treated in a 0.1M ammonia solution in an ultrasound bath for 15 minutes, whereupon they were separated again by means of filtration. The particles were finally washed three times by suspension in distilled water, followed by separation by filtration, and then dried in a heating cabinet at 60° C. for 12 hours. The particles were finally calcined at 600° C. in air for 4 hours, after heating to this temperature at a rate of 10° C./min.

Figure 2:
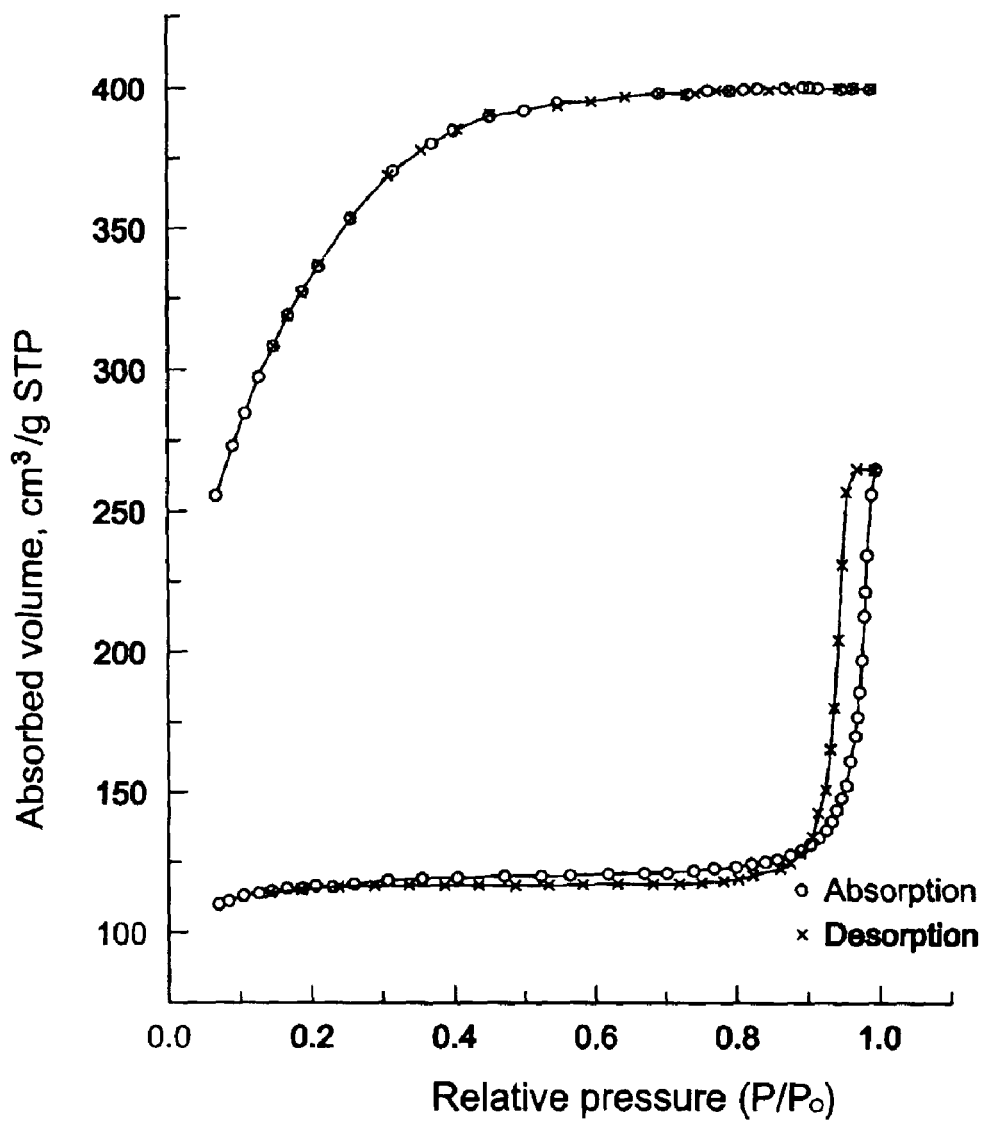
FIG. 2 represents adsorption-desorption isotherms measured for spherical particles of amorphous silica of Examples 1 and 2.

The resulting material consisted of very hard, solid, white spherical particles with a size distribution identical to that in the employed ion exchanger. Elemental analysis showed that the particles were almost entirely free of carbon, hydrogen and nitrogen, which clearly shows that the ion exchanger material had been completely eliminated in the calcining stage. X-ray diffractometry also showed that the material was completely amorphous. The particles were further analyzed by nitrogen adsorption measurements at the boiling point of nitrogen to determine the specific surface area, the adsorption isotherm and pore size distribution. The specific surface, area was calculated from the adsorption data according to the BET equation as 1220 $m^2/g$. The recorded isotherm is shown in FIG. 2 and was of type I, which is typical of microporous materials. Calculation of the pore size distribution by the BJH method (desorption isotherm) showed that a very small fraction (about 20 $m^2/g$) of the total specific surface area of the material was found in pores in the mesopore range (diameter >20 Å). The average pore diameter was calculated at 9.5 Å by the Horvath-Kawazoes method.

EXAMPLE 2

This example describes production of spherical particles of amorphous aluminum silicate with high specific surface area in pores in both the micro- and mesopore range.

25 grams of a synthesis solution with the molar composition: 2.4 $Na_2O$/1.0 TEACl/0.4 $Al_2O_3$/10 $SiO_2$/460 $H_2O$ (TEACl=tetraethylammonium chloride) were added to 2.0 grams of a strongly basic ion exchanger of the type Dowex MSA-1 (particle size 20–50 mesh and [dry] ion exchange capacity of 4 mEq/g) in a polyethylene reactor. The synthesis mixture was prepared by first dissolving 0.75 grams sodium aluminate (50.6 wt % $Al_2O_3$, 36 wt % $Na_2O$) in 35 grams of a 1M NaOH solution at 100° C. This solution was then added to a mixture of 40 grams distilled water, 1.66 grams TEACl (Merck) and 15 grams silica sol (Bindzil 40/130, Eka Chemicals AB, solids content 41.36 wt %, 0.256 wt % $Na_2O$) during agitation for 2 hours. The mixture of ion exchanger and synthesis solution was treated in a polyethylene reactor equipped with a reflux condenser in an oil bath at 100° C. for 48 hours. After this time, the ion exchanger particles were separated from the solution by filtration and treated in a 0.1M ammonia solution in an ultrasound bath for 15 minutes, whereupon they were separated again by filtration. The particles were finally washed three times by suspension in distilled water, followed by separation by filtration, and then dried in a heating cabinet at 60° C. for hours. The particles were finally calcined at 600° C. in air for 4 hours, after heating to this temperature at a rate of 10° C./min.

Visual inspection and analysis with a scanning electron microscope showed that the resulting material consisted of very hard, solid, white spherical particles with size distribution identical to that in the employed ion exchanger. Elemental analysis showed that the particles were almost entirely free of carbon, hydrogen and nitrogen, which clearly shows that the ion exchanger material had been fully eliminated in the calcining stage. X-ray diffractometry also showed that the material was completely amorphous. The particles were further analyzed by nitrogen adsorption measurements at the boiling point of nitrogen to determine the specific surface area, adsorption isotherms and pore size distribution. The specific surface area was calculated from the adsorption data according to the BET equation as 594 $m^2/g$. The recorded isotherm is shown in Example 2 and was of type IV. Calculation of the pore size distribution by the BJH method (desorption isotherm) showed that a relatively large percentage of the total (cumulative) pore volume (about 65%) was found in pores in the mesopore range (radius >20 Å).

EXAMPLE 3

This example describes production of spherical particles of molecular sieve silicalite-1 with the process according to the invention.

14.3 grams of a synthesis solution with the molar composition: 9 TPAOH/25 $SiO_2$/480 $H_2O$/100 EtOH were added to 1.0 grams of macroporous strongly basic ion exchanger of the Dowex MSA-1 type (particle size 20–50 mesh [dry]; ion exchange capacity: 4 mEq/g). The synthesis mixture was prepared as described in Example 1. The mixture of ion exchanger and synthesis solution was treated in a polyethylene reactor equipped with a reflux condenser in an oil bath at 100° C. for 48 hours. After this time, the ion exchanger particles were separated from the solution and the material was crystallized in the bulk phase by filtration and treated in a 0.1M ammonia solution in an ultrasound bath for 15 minutes, whereupon they were separated again by filtration. The particles were finally washed three times by suspension in distilled water, followed by separation by filtration, and then dried in a heating cabinet at 60° C. for 12 hours. The particles were finally calcined at 600° C. in air for 10 hours, after heating to this temperature at a rate of 1° C./min.

Figure 3:
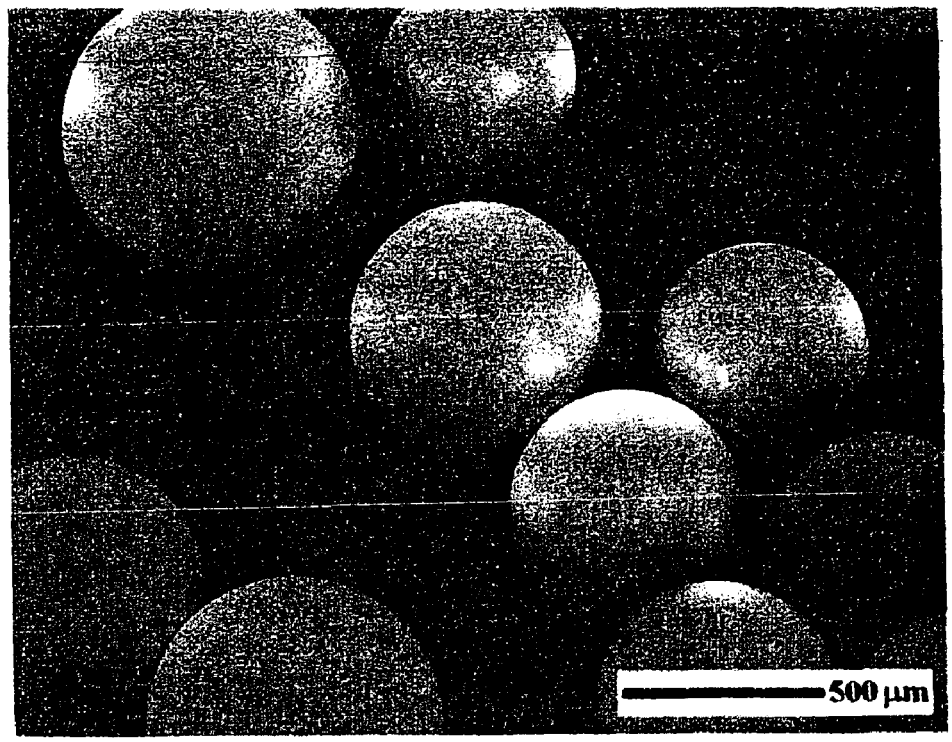
FIG. 3 and FIG. 4 show SEM micrographs, at two different magnifications, of spherical particles of the molecular sieve silicalite-1 of Example 3.
Figure 4:
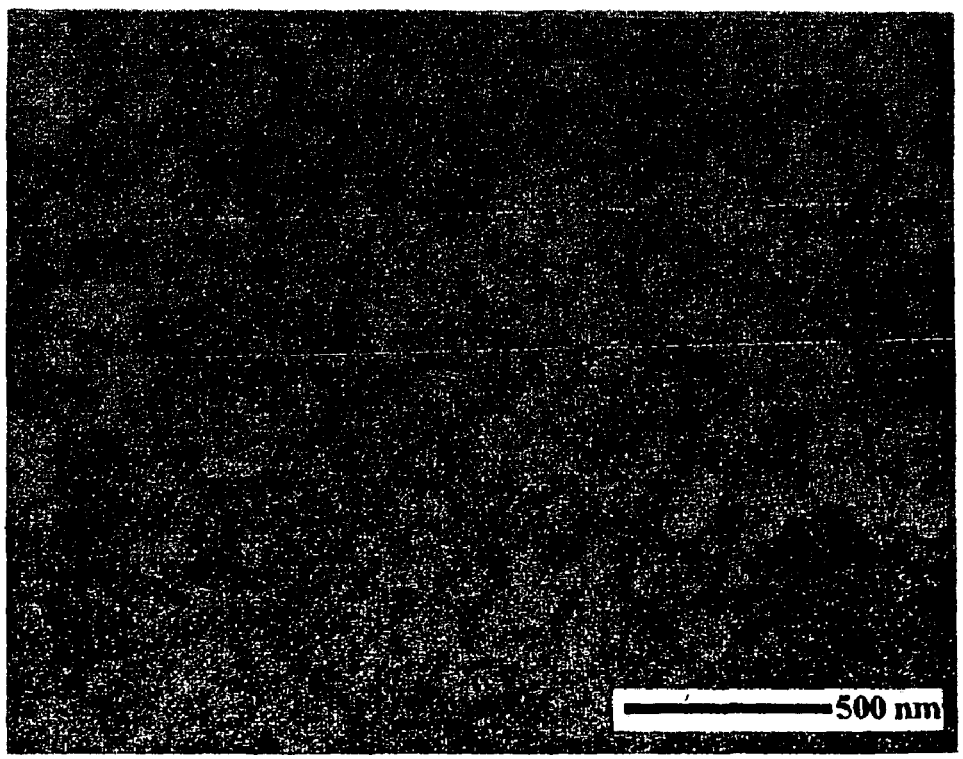
Figure 5:
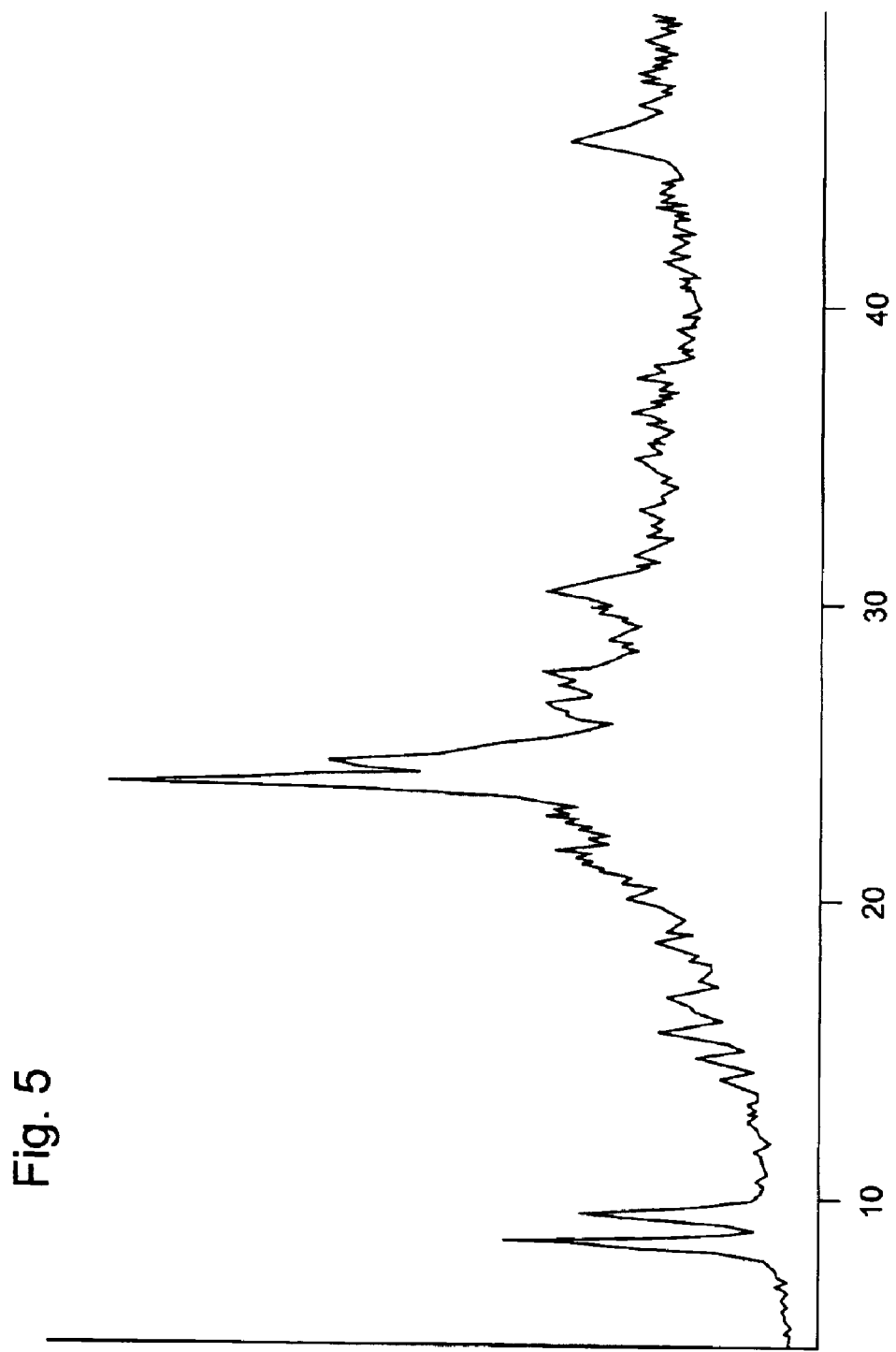
FIG. 5 is an X-ray diffraction pattern for spherical particles of the molecular sieve silicalite-1 of Example 3.

Visual inspection and scanning electron microscopy revealed that the resulting material consisted of very hard, solid (homogeneous), white spherical particles with a size distribution identical to that in the employed ion exchanger. Elemental analysis showed that the particles were almost entirely free of carbon, hydrogen and nitrogen, which clearly shows that the ion exchanger material was fully eliminated in the calcining stage. FIGS. 3 and 4 are two SEM photographs of the product taken at two different magnifications. FIG. 3 taken at the lower magnification shows the spherical character of the particles, whereas FIG. 4 taken at high magnification shows the presence of small primary particles (primary crystals) with a size of about 100 nm. X-ray diffractometry revealed that the material is crystalline and consists of silicalite-1, but that it also contains a percentage of amorphous material. An X-ray diffraction pattern for this sample is shown in FIG. 5. Analysis with nitrogen adsorption gave a specific surface area of 438 $m^2/g$ and showed that most of the pore volume was found in micropores with an average pore diameter of 6 Å, calculated according to the Horvath-Kawazoes method.

EXAMPLE 4

This example describes production of spherical particles of molecular sieve zeolite ZSM-5 with the process according to the invention.

15 grams of a synthesis solution with the molar composition: 0.58 $Na_2O$/9 TPAOH/0.5 $Al_2O_3$/25 $SiO_2$/405 $H_2O$ were added to 1.0 grams of a macroporous strongly basic anion exchanger of the Dowex MSA-1 type (particle size 20–50 mesh [dry]; ion exchange capacity: 4 mEq/g). The synthesis mixture was prepared by first dissolving 0.408 grams of aluminum isopropoxide (Sigma) in 10 grams of 1.0M tetrapropylammonium hydroxide (Sigma). Another solution was prepared by dissolving 6.0 grams freeze-dried silica sol (Bindzil 30/220, 31 wt % $SiO_2$, 0.5 wt % $Na_2O$ Eka Chemicals, AB) in 26 grams 1.0M TPAOH at 100° C. The two solutions were mixed during agitation for 30 minutes. The mixture of ion exchanger and synthesis solution was treated in a polyethylene reactor equipped with a reflux condenser in an oil bath at 100° C. for 20 days. After this time, the ion exchanger particles were separated from the solution and the material was crystallized in the bulk phase by filtration and treated in a 0.1M ammonia solution in an ultrasound bath for 15 minutes, whereupon they were separated again by filtration. The particles were finally washed three times by suspension in distilled water, followed by separation by filtration, and then dried in a heating cabinet at 50° C. for 12 hours. The particles were finally calcined at 600° C. in air for 10 hours, after heating to this temperature at a rate of 1° C./min.

Visual inspection and analysis with a scanning electron microscope showed that the product largely consisted of white, solid particles with a size and shape identical to that of the employed ion exchanger. A relatively large fraction of the product, however, was shown to consist of particles with roughly the same size as the employed ion exchanger, but with a more irregular shape. SEM analysis at high magnification showed that the particles consisted of intergrown crystals with a morphology typical of MFI structures and with a size of about 1 μm. X-ray diffractometry showed that the particles consisted of zeolite ZSM-5, but also a relatively large fraction of amorphous material. The specific surface area was measured by nitrogen adsorption at 612 $m^2$/g.

EXAMPLE 5

This example describes production of spherical particles of molecular sieve zeolite A with the process according to the invention.

18.0 grams of a synthesis solution with the molar composition: 0.22 $Na_2O$/5.0 $SiO_2$/$Al_2O_3$/8 $TMA_2O$/400 $H_2O$ were added to 1.0 grams of a strongly basic anion exchanger of the Dowex MSA-1 type. The synthesis mixture was prepared by first dissolving 1.25 grams of aluminum isopropoxide (Sigma) and 9.0 grams tetramethylammonium hydroxide pentahydrate (Sigma) in 0.90 grams of 1.0M solution of NaOH and 3.0 grams water during agitation for 2 hours. This solution was added, in turn, to a mixture of 3.0 grams silica sol (Bindzil 30/220, see Example 4) and 12 grams of distilled water, whereupon the resulting solution was agitated for 3 hours. The mixture of ion exchanger and synthesis solution was treated in a polyethylene reactor equipped with a reflux condenser in an oil bath at 100° C. for 10 hours. After this time, the ion exchanger particles were separated from the solution and the material was crystallized in the bulk phase by filtration and treated in a 0.1M ammonia solution in an ultrasound bath for 15 minutes, whereupon they were separated again by filtration. The particles were finally washed three times by suspension in distilled water, followed by separation by filtration, and then dried in a heating cabinet at 60° C. for 12 hours. The particles were finally calcined at 600° C. in air for 10 hours, after heating to this temperature at a rate of 1° C./min.

Visual inspection and analysis by scanning electron microscopy showed that the product largely consisted of light brown, solid particles with a size and shape identical to that of the employed ion exchanger. A is smaller fraction of the product consisted of fragmented particles. SEM at high magnification showed that the particles are homogeneous and constructed from intergrown primary particles with a size up to about 300 nm. X-ray diffractometry showed that the resulting material contained zeolite A and a certain amount of amorphous material. Nitrogen adsorption measurements gave a specific surface area (according to the BET equation) of 306 $m^2$/g and indicated the presence of both micro- and mesoporosity.

EXAMPLE 6

This example describes production of spherical particles of molecular sieve zeolite Beta using the process according to the invention.

15 grams of a synthesis solution with the molar composition: 0.35 $Na_2O$/9 TEAOH/0.5 $Al_2O_3$/25 $SiO_2$/295 $H_2O$ were added to 1.0 grams of a strongly basic anion exchanger of the Dowex MSA-1 type. The synthesis mixture was prepared by dissolving 0.81 grams aluminum isopropoxide (Sigma) in 6.0 grams tetraethylammonium hydroxide (TEAOH, 20% solution) at 100° C. This solution was added to a solution of 6.0 grams freeze-dried silica sol (Bindzil 30/220, see Example 4) dissolved in 20 grams of TEAOH (20% solution) and the resulting solution was agitated for 30 minutes. The mixture of ion exchanger and synthesis solution was treated in a polyethylene reactor equipped with a reflux condenser in an oil bath at 100° C. for 8 days. After this time, the ion exchanger particles were separated from the solution and the material was crystallized in the bulk phase by filtration and treated in a 0.1M ammonia solution in an ultrasound bath for 15 minutes, whereupon the particles were separated again by filtration. The particles were finally washed three times by suspension in distilled water, followed by separation by filtration, and then dried in a heating cabinet at 60° C. for 12 hours. The particles were finally calcined at 600° C. in air for 10 hours, after heating to this temperature at a rate of 1° C./min.

Visual inspection, as well as analysis with a scanning electron microscope, showed that the product largely consisted of hard, white, solid particles with a size and shape identical to that of the employed ion exchanger. SEM analysis at high magnification shows that the material is constructed of intergrown primary particles with a size of about 80 nm. X-ray diffractometry showed that the particles contained zeolite Beta as the only crystalline phase. The specific surface area calculated with the BET equation, based on nitrogen adsorption data, was 580 $m^2$/g.

EXAMPLE 7

This example describes how a film of molecular sieve silicalite-1 can be built up on the surface of a macrostructure of silicalite-1 produced according to Example 3.

10.0 grams of synthesis solution with the composition and preparation according to Example 3 were added to 0.20 grams of calcined product produced according to Example 3. This mixture was treated at 100° C. in a polyethylene reactor equipped with a reflux condenser for 48 hours. After this time, the particles were separated from the solution and the material was crystallized in the bulk phase by filtration and treated in a 0.1M ammonia solution in an ultrasound bath for 15 minutes, whereupon they were separated again by filtration. The particles were finally washed three times by suspension in distilled water, followed by separation by filtration, and then dried in a heating cabinet at 60° C. for 12 hours. Part of the material was calcined at 600° C. for 10 hours, after heating to this temperature at a rate of 1° C./min. X-ray diffraction measurements on the calcined sample revealed that the sample contained silicalite-1 as the only crystalline phase. Scanning electron microscopy detected an outer layer of silicalite-1 on the surface of the particles, a layer that synthesis had built up from about 300/-nm large primary particles. The specific surface area was determined for the uncalcined sample as 92 $m^2/g$, whereas the corresponding value measured for the calcined sample was 543 $m^2/g$. The difference in the surface before and after calcining indicates that the outer shell of silicalite-1 effectively encloses the open pore system in the original particles.

What is claimed is:

1. A composite material comprising a porous organic ion-exchanger and a continuous three-dimensional network of inorganic material comprising a crystalline molecular sieve formed inside the pore structure of said porous organic ion-exchanger.

2. The composite material recited in claim 1, wherein said porous organic ion-exchanger is a porous organic anionic ion-exchanger.

3. The composite material recited in claim 2, wherein said porous anionic ion-exchanger has an ion-exchange capacity greater than about 1 meg./gm of dry porous anionic ion-exchanger.

4. The composite material recited in claim 2, wherein said porous organic anionic ion-exchanger is a basic anion-exchange resin containing quartenary ammonium group.

5. The composite material recited in claim 1, wherein said inorganic material is a crystalline molecular sieve comprising a zeolite or a metallo-silicate substantially free of aluminum.

6. The composite material recited in claim 5, wherein said crystalline molecular sieve is selected from the group consisting of silicalite 1, hydroxysodalite, zeolite A, zeolite beta, zeolite X, zeolite Y, ZSM-2, ZSM-5, mordenite, and zeolite L.

7. The composite material recited in claim 5, wherein said crystalline molecular sieve is a ZSM-5 or silicalite 1.

8. The composite material recited in claim 5, wherein said crystalline molecular sieve is a ZSM-5.

9. A composite material comprising a porous organic ion-exchanger and macrostructures comprising a continuous three-dimensional network of inorganic material comprising a crystalline molecular sieve formed inside the pore structure of said porous organic ion-exchanger prepared by a process comprising:
    (a) forming a mixture comprising a synthesis composition capable of forming said inorganic material and a porous organic ion-exchanger; and
    (b) converting said synthesis composition under hydrothermal conditions to form said inorganic material.

10. The composite material recited in claim 9 further comprising the step of removing said porous organic ion-exchanger to obtain macrostructures of said inorganic material.

11. The composite material recited in claim 10, wherein said porous organic ion-exchanger is removed by calcination.

12. The composite material recited in claim 10, wherein said porous organic ion-exchanger is removed by dissolving said porous organic ion-exchanger.

13. The composite material recited in claim 9, wherein said inorganic material is a crystalline molecular sieve.

14. The composite material recited in claim 13, wherein said seeds are either formed in said porous organic ion-exchanger or said seeds are introduced into said porous organic ion-exchanger by ion-exchange or adsorption.

15. The composite material recited in claim 13, wherein said seeds are crystals of a molecular sieve having a size of less than 200 nm.

16. The composite material recited in claim 9, wherein seeds present in said synthesis composition grow and form said inorganic material.

17. The composite material recited in claim 16, wherein said seeds are oligomeric anions of silicates or microcrystals of a molecular sieve.

18. The composite material recited in claim 9, wherein said porous organic ion-exchanger is a porous organic anionic ion-exchanger.

19. The composite material recited in claim 18, wherein said porous organic anionic ion-exchanger has an ion-exchange capacity greater than about 1 meg./gm of dry porous anionic ion-exchanger.

20. The composite material recited in claim 18, wherein said porous anionic ion-exchanger is a basic anion-exchange resin containing quartenary ammonium groups.

21. The composite material recited in claim 9, wherein said crystalline molecular sieve is a zeolite or a metallo-silicate substantially free of aluminum.

22. The composite material recited in claim 21, wherein said crystalline molecular sieve is selected from the group consisting of silicalite 1, hydroxysodalite, zeolite A zeolite beta, zeolite X, zeolite Y, ZSM-2, ZSM-5, mordenite, and zeolite L.

23. The composite material recited in claim 21, wherein maid crystalline molecular sieve is a ZSM-5 or silicalite 1.

24. The composite material recited in claim 9, wherein said macrostructures have the size and shape of said porous organic ion-exchanger.

25. The composite material recited in claim 24, wherein said macrostructures have at least one dimension greater than about 110 mm.

26. The composite material recited in claim 24, wherein said macrostructures are spherical or cylindrical.

27. The composite material recited in claim 9, wherein said hydrothermal conditions include a temperature exceeding 80° C.

28. The composite material recited in claim 9, wherein said synthesis mixture is a silicate, an aluminosilicate, or a metallo-silicate solution.

29. The composite material recited in claim 9, wherein said synthesis mixture has a composition which upon hydrothermal treatment in the absence of an organic ion-exchanger results in the crystallization of said inorganic material.

* * * * *